United States Patent [19]

Giles

[11] Patent Number: 4,890,500

[45] Date of Patent: Jan. 2, 1990

[54] MEASURING APPARATUS

[75] Inventor: Alan F. Giles, St. Neots, Great Britain

[73] Assignee: Thomas J. Lipton, Inc., Englewood Cliffs, N.J.

[21] Appl. No.: 271,177

[22] Filed: Nov. 14, 1988

[30] Foreign Application Priority Data

Nov. 12, 1987 [GB] United Kingdom ................. 8726478

[51] Int. Cl.[4] .................................................. G01F 1/74

[52] U.S. Cl. .............................. 73/861.41; 73/861.04; 250/222.2

[58] Field of Search .................. 73/28, 861.41, 861.04, 73/865.5; 250/222.2; 364/555

[56] References Cited

U.S. PATENT DOCUMENTS 4,381,674 5/1983 Abts .................................. 73/865.5

4,743,760 5/1988 Giles ................................ 73/861.41

*Primary Examiner*—Herbert Goldstein

*Attorney, Agent, or Firm*—Brumbaugh, Graves, Donohue & Raymond

[57] ABSTRACT

Apparatus for detecting and counting flowable particulates having means for feeding these particulates at a uniform speed through a measuring area, defined by radiation emitting and sensing means which are arranged in a plane transverse to the feeding direction of the particulates and such that an even number of fan shaped, overlapping arrays of sensing beams can be generated between the emitting and sensing means, each pair of arrays having two lines of symmetry: the one connecting the convergence points of the fan shaped arrays and the other being the perpendicular bisector thereof.

7 Claims, 1 Drawing Sheet

MEASURING APPARATUS

The invention relates to an apparatus for detecting and counting flowable particulates comprising means for feeding particulates at a substantially uniform speed through a measuring area, defined by radiation emitting and radiation sensing means being arranged in a plane transverse to the direction of travel of the particulates and connected to computing means.

Such apparatus is described in the European patent application No. 0.27.567 of the same inventor which is included here by reference thereto.

When using such an apparatus care has to be taken that the particles are caused to flow along a well defined path and that a rather fine grid of parallel radiation beams in at least two crossing directions is used.

The first requirement puts a restriction on the throughput of the apparatus, the latter requirement cannot be easily met because of the physical dimensions of the radiation emitting and particularly the sensing means.

The invention seeks to lessen or remove these disadvantages and restrictions and to that end the apparatus as described hereinbefore is characterized in that the radiation emitting and sensing means are arranged such that at least one pair of fan shaped, overlapping arrays of sensing beams can be generated, each pair of arrays having two lines of symmetry: the one connecting the convergence points of the fan shaped arrays, the other being the perpendicular bisector thereof. In order to improve the particle discrimination, the apparatus in a preferred embodiment, is provided with emitting and sensing means, which are arranged such that fan shaped arrays of beams in a rotation symmetrical arrangement can be generated. In a particularly preferred embodiment of the emitting and the sensing means the ones are arranged at the vertices of a regular polygon having an even number of angles and the others about along the sides of said polygon.

Most commercial radiation sensing means have a total sensitivity angle of about 60° and therefore a suitable arrangement at lowest expense can be obtained if the above mentioned polygon is a hexagon.

Generally speaking the sensing elements together with the amplifiers used in conjunction therewith require more space than the emitters and in that case it is preferred that each fan shaped array is delimited by one sensing element and a plurality of emitting elements.

Again for better particle discrimination and reliability of the results the arrangement of the sensing elements and the emitting elements is such that the axis of maximum transmission of each emitting element coincides with a direction of relative low sensitivity of a corresponding sensing element while the axis of maximum sensitivity of said element coincides with a direction of relative low transmission of said emitting element.

Particularly preferred is an arrangement wherein the one kind of the emitting and the sensing means is arranged at the vertices of a polygon each with its main axis directed at the opposite vertex and the other kind of elements along the sides of the polygon each with its main axis at right angles to the respective side.

A more thorough understanding of the invention may be obtained from the following description taken in connection with the accompanying schematic drawings, in which.

Figure 1:
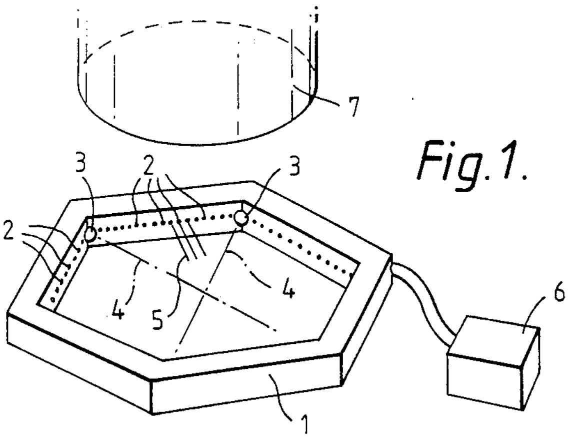
FIG. 1 is a schematic drawing in perspective view of an apparatus of the invention.
Figure 2:
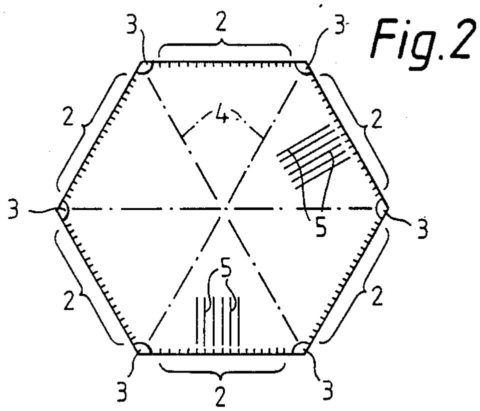
FIG. 2 is a simplified diagram of the arrays of radiation used in the apparatus of FIG. 1.

FIGS. 1 and 2 illustrate a preferred embodiment of the present invention in which in a regular hexagonal support 1 radiation emitters 2 and sensors 3 are arranged, the sensors 3 at the vertices each with its axis of maximum sensitivity 4 directed at the opposite vertex and the emitters arranged along the sides of the hexagonal support, each with its axis of maximum emission 5 at right angles to said side. Both the sensors and the emitters are connected to a computing means 6 for controlling the working thereof and for computing the information obtained from the sensors. Feeding means 7 for feeding particulate material through the center of the hexagonal support 1 are arranged over said support.

Figure 3:
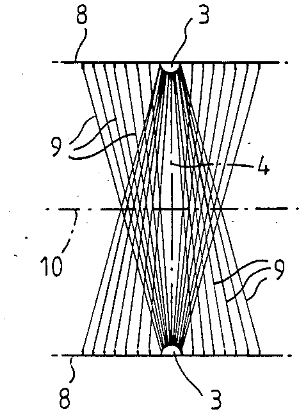
FIGS. 3 and 4 are alternative embodiments shown in the same manner as in FIG. 2.

FIG. 3 schematically illustrates the most simple embodiment of the invention: two sensors 3 are arranged opposite each other with their axes of maximum sensitivity 4 coinciding. Next to each sensor 3 along lines 8 extending at right angles to said axes 4 a plurality of radiation emitters 2 are arranged, such that their axes of maximum emission are parallel to the axes 4.

This arrangement of sensors and emitters is defining two arrays of fan shaped sensing beams 9 which arrays are symmetrical with respect to the line 4 extending between the sensors 3, being at the convergence points of the arrays, and with respect to the line 10, which is the perpendicular bisector of said line 4.

Figure 4:
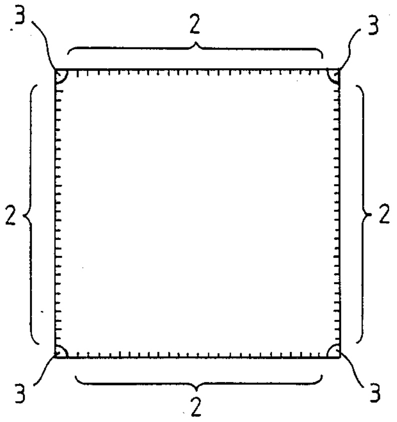

In FIG. 4 an alternative embodiment is being shown in a square arrangement, the sensors 3 being arranged at the corners of a square and the emitters 2 along the sides.

I claim:

1. Apparatus for detecting and counting flowable particulates comprising means for feeding particulates at a substantially uniform speed through a measuring area, defined by radiation emitting and radiation sensing means being arranged in a plane transverse to the direction of travel of the particulates an connected to computing means, wherein the radiation emitting and sensing means are arranged such that at least one pair of fan shaped, overlapping arrays of sensing beams can be generated, each pair of arrays having two lines of symmetry: the one connecting the convergence points of the fan shaped arrays, the other being the perpendicular bisector thereof.

2. Apparatus according to claim 1, wherein the emitting and sensing means are arranged such that fan shaped arrays of beams in a rotation symmetrical arrangement can be generated.

3. Apparatus according to claim 2, wherein of the emitting and the sensing means the ones are arranged at the vertices of a regular polygon having an even number of angles and the others about along the sides of said polygon.

4. Apparatus according to claim 3, wherein the polygon is a hexagon.

5. Apparatus according to claim 1, wherein each fan shaped array is delimited by one sensing element and a plurality of emitting elements.

6. Apparatus according to claim 1, wherein the axis of maximum transmission of each emitting element coincides with a direction of relative low sensitivity of a corresponding sensing element while the axis of maximum sensitivity of said element coincides with a direction of relative low transmission of said emitting element.

7. Apparatus according to claim 3, wherein the one kind of the emitting and the sensing means is arranged at the vertices of a polygon each with its main axis directed at the opposite vertex and the other kind of elements along the sides of the polygon each with its main axis at right angles to the respective side.

* * * * *